(12) United States Patent
Li et al.

(10) Patent No.: US 10,977,408 B1
(45) Date of Patent: Apr. 13, 2021

(54) SYSTEMS AND METHODS OF CONCURRENT PLACEMENT OF INPUT-OUTPUT PINS AND INTERNAL COMPONENTS IN AN INTEGRATED CIRCUIT DESIGN

(71) Applicant: CADENCE DESIGN SYSTEMS, INC., San Jose, CA (US)

(72) Inventors: Fangfang Li, Shanghai (CN); Xincheng Zhang, Shanghai (CN); Anil Kumar Mishra, Uttar Pradesh (IN); Md Shaukat Ullah, Gautam Budh Nagar (IN); Feng Cheng, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/741,345

(22) Filed: Jan. 13, 2020

(51) Int. Cl.
*G06F 30/392* (2020.01)
*G06F 111/04* (2020.01)

(52) U.S. Cl.
CPC ........ *G06F 30/392* (2020.01); *G06F 2111/04* (2020.01)

(58) Field of Classification Search
USPC ........................................................ 716/122
See application file for complete search history.

(56) References Cited

U.S. PATENT DOCUMENTS

| | | | | |
|---|---|---|---|---|
| 2005/0097485 | A1* | 5/2005 | Guenthner | G06F 30/34 716/113 |
| 2014/0189630 | A1* | 7/2014 | Viswanath | G06F 30/392 716/129 |

* cited by examiner

*Primary Examiner* — Bryce M Aisaka
(74) *Attorney, Agent, or Firm* — Foley & Lardner LLP

(57) ABSTRACT

Embodiments disclosed herein describe systems, methods, and products for concurrently placing and optimizing input-output (IO) pins and internal components of an integrated circuit (IC) design. In an illustrative process flow, the computer (executing an illustrative EDA tool) may import the IC design and unplace the IO pins of the imported IC design. The computer may set one or more constraints for the IO pins with more degrees of freedom than the conventional pre-fixed locations. The computer may then concurrently place the IO pins and the internal components such that the IO pins obey the one or more constraints. The computer may iteratively optimize the placement of the IO pins and the internal components while ensuring that the one or more constraints are not violated.

20 Claims, 3 Drawing Sheets

100

US 10,977,408 B1

SYSTEMS AND METHODS OF CONCURRENT PLACEMENT OF INPUT-OUTPUT PINS AND INTERNAL COMPONENTS IN AN INTEGRATED CIRCUIT DESIGN

TECHNICAL FIELD

This application is generally directed to placement and placement optimization in an integrated circuit design flow and more specifically towards a concurrent placement and optimization of input-output pins and internal components of an integrated circuit design.

BACKGROUND

Modern semiconductor based integrated circuits (ICs) are incredibly complex and contain millions of circuit devices, such as transistors, and millions of interconnections between the circuit devices. Designing such complex circuits cannot be accomplished manually, and circuit designers use computer based Electronic Design Automation (EDA) tools for synthesis, debugging, and functional verification of the ICs. EDA tools provide various functionality to facilitate different processes for IC design. One of the processes that EDA tools facilitate is placement and placement optimization of various components within an IC design.

However, conventional EDA tools provide a limited component placement functionality. For example, a conventional EDA tool places input/output (TO) pins at pre-fixed locations before allowing for placement of macros and standard cells. This limitation generally has a large impact on downstream placement processes, the overall IC design flow, and the final IC design. For example, a downstream placement optimization algorithm, which has to start with the inflexibility of the pre-fixed IO pin locations, may have severely restricted options for moving one or more components of the IC design. On the quality-of-results (QoR) metric (a design quality metric based upon the overall wirelength and instances of negative slacks in the IC design), the IC design generated the conventional EDA has an inferior performance.

In addition, the IC design generated by conventional EDA tools may also cause split modules (or a bad module distribution). For example, a circuit designer may specify a module to be connected to ten IO pins. The pre-fixed locations of the IO pins may cause the ten IO pins to be at different boundary edges of the IC design. Therefore, signals through a first subset of the ten IO pins at a first boundary edge may arrive at the module at a different time than signals through a second subset of the ten IO pins at a second boundary edge resulting in a split module. Split modules may cause undesirable timing violations that may have to be remedied before the IC design is taped out. In other words, split modules cause a significant delay in the convergence of the IC design.

As such, a significant improvement upon component placement methods in IC design is therefore desired.

SUMMARY

What is therefore are significantly improved EDA tools (also referred to as EDA systems) that concurrently place IO pins and internal components in an IC design. What is further desired as EDA tools that remedy the pre-fixed location limitation for the IO pins such that the IO pins can concurrently be placed with the internal components of an IC design.

Embodiments disclosed herein attempt to solve the aforementioned technical problems and may provide other benefits as well. A computer (executing an illustrative EDA tool) may concurrently place IO pins and the internal components in an IC design. In an illustrative process flow, the computer may import the IC design and unplace the IO pins of the imported IC design. The computer may set one or more constraints for the IO pins with more degrees of freedom than the conventional pre-fixed locations. The computer may then concurrently place the IO pins and the internal components such that the IO pins obey the one or more constraints. The computer may iteratively optimize the placement of the IO pins and the internal components while ensuring that the one or more constraints are not violated.

In an embodiment, a computer implemented method comprises importing, by a computer, an integrated circuit design including a plurality of input-output pins and a plurality of internal components; unplacing, by the computer, the plurality of input-output pins of the imported integrated circuit design; setting, by the computer, one or more input-output pin constraints for the integrated circuit design; concurrently placing, by the computer, the plurality of input-output pins and the plurality of internal components, wherein the placement of the plurality of input-output pins obeys the one or more input-output pin constraints; and iteratively optimizing, by the computer, the concurrent placement of the plurality of input-output pins and the plurality of internal components by updating corresponding locations of at least one input-output pin and at least one internal component, wherein an updated location of the at least one input-output pin obeys the one or more input-output pin constraints.

In another embodiment, a system comprises a non-transitory storage medium storing a plurality of computer program instructions; and a processor electrically coupled to the non-transitory storage medium and configured to execute the plurality of computer program instructions to: import an integrated circuit design including a plurality of input-output pins and a plurality of internal components; unplace the plurality of input-output pins of the imported integrated circuit design; set one or more input-output pin constraints for the integrated circuit design; concurrently place the plurality of input-output pins and the plurality of internal components, wherein the placement of the plurality of input-output pins obeys the one or more input-output pin constraints; and iteratively optimize the concurrent placement of the plurality of input-output pins and the plurality of internal components by updating corresponding locations of at least one input-output pin and at least one internal component, wherein an updated location of the at least one input-output pin obeys the one or more input-output pin constraints.

In yet another embodiment, a computer readable non-transitory medium contains one or more computer instructions, which when executed by a processor cause the processor to import an integrated circuit design including a plurality of input-output pins and a plurality of internal components; unplace the plurality of input-output pins of the imported integrated circuit design; set one or more input-output pin constraints for the integrated circuit design; concurrently place the plurality of input-output pins and the plurality of internal components, wherein the placement of the plurality of input-output pins obeys the one or more input-output pin constraints; and iteratively optimize the concurrent placement of the plurality of input-output pins and the plurality of internal components by updating corresponding locations of at least one input-output pin and at least one internal component, wherein an updated location of the at least one input-output pin obeys the one or more input-output pin constraints.

BRIEF DESCRIPTION OF THE DRAWINGS

The accompanying drawings constitute a part of this specification and illustrate an embodiment of the subject matter described herein.

DETAILED DESCRIPTION

Figure 1:
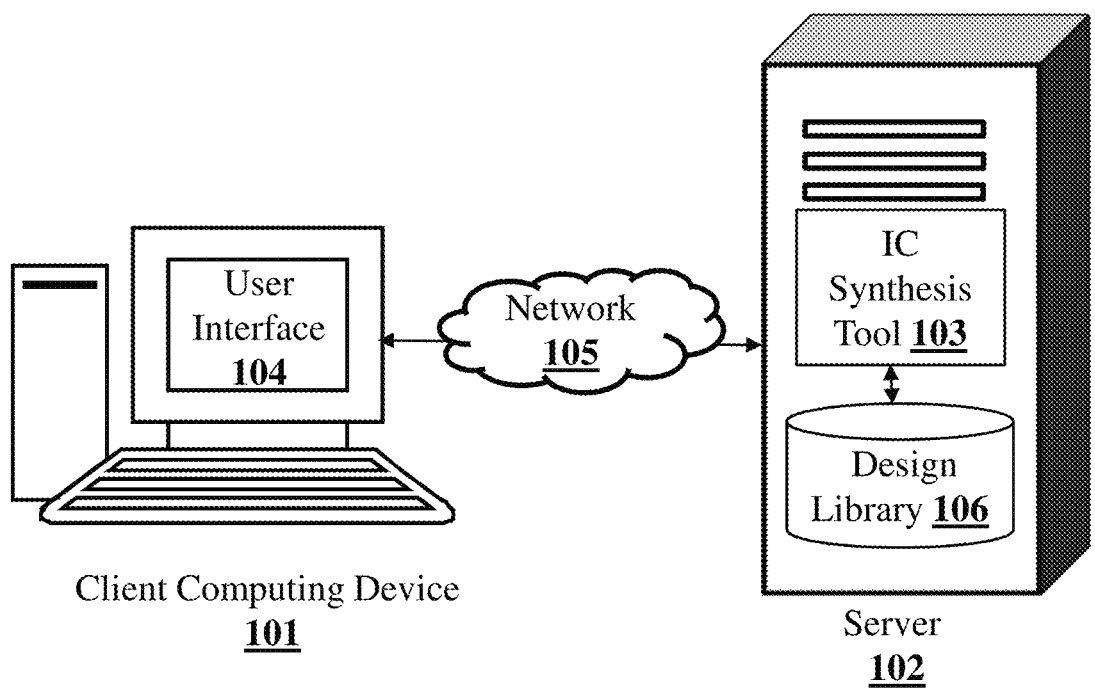
FIG. 1 shows an illustrative electronic design automation system for concurrent placement of IO pins and internal components of an IC design, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describes illustrative systems and methods for concurrent placement of IO pins and internal components in an IC design. In an illustrative method, a computer (executing an illustrative EDA tool) may import an IC design with pre-placed IO pins (also referred to as pre-fixed IO pins) at the boundary edges of the IC design. The computer may unplace the IO pins and set one or more IO pin constraints for the unplaced IO pins. The computer may then concurrently place the IO pins and internal components, such as macros and cells, where the IO pins are placed to obey the one or more IO pin constraints. The computer may then iteratively modify the placement of the IO pins and the internal components while ensuring that the optimized placement of the IO pins does not violate the one or more IO pin constraints.

A cell (also referred to as standard cell) as described herein may be circuit component within the IC design. For example, a cell may be combination logic gate (e.g., an AND gate) or a memory component (e.g., a flip-flop) in the IC design. The cells are generally provided as templates, which a circuit designer can configure by defining/changing one or more parameters within the templates. For example, a circuit designer can generate an instance of an AND gate by changing corresponding parameters in a template (e.g., a master cell). It should generally be understood that each of the cells may define a single component (e.g., a logic gate, a memory unit) in the IC design and therefore may be considered building blocks of the IC design. Cells are generally smaller in size that the macros.

IO pins as described herein may form the input and output components of the IC design. IO pins may also be bi-directional (BIDI) functional as input and output components at the same time. The IO pins may be generally be disposed towards the edges of the IC design. In a fabricated IC, the IO pins are connected to other components in the overall circuit. For example, if the fabricated IC is a microprocessor, the IO pins may connect to one or more memory chips of a computer embedding both the microprocessor and the one or more memory chips. It should generally be understood that that IO pins may include any component (not necessarily a pin or a design thereof) in the IC design to communicate with other components in the circuit/system where the fabricated IC is deployed.

A macro (also referred to as a macroblock) as described herein may be a block of components within an IC design. For example, a macro may be a large, predefined memory block that can be placed within the IC design without any internal modification. As another example, a macro may be a third party design with components to achieve a particular functionality within the IC design. As yet another example, a macro may be an intellectual property (IP) block within the IC design. It should generally be understood that he macro as described herein refers to any type of relatively large block (e.g., larger than standard cells) that may be placed in its entirety in the IC design.

FIG. 1 shows an illustrative electronic design automation (EDA) system 100 for concurrently placing and optimizing IO pins and internal components of an IC design, according to an embodiment. The EDA system 100 may include any number of computing devices; the illustrative embodiment includes a client computing device 101 and a server 102. Furthermore, one or more components of the electronic design automation system 100 may be grouped and referred to as an electronic design automation tool (or EDA tool). For example, the client computing device 101 may be executing a first subset of software modules of the EDA tool and the server 102 may be executing a second subset of software modules forming the EDA tool. As shown, the client computing device 101 may be connected to the server 102 via hardware and software components of one or more networks 105. A network 105 may also connect various computing devices with databases or other components of the system 100. Examples of the network 105 include, but are not limited to, Local Area Network (LAN), Wireless Local Area Network (WLAN), Metropolitan Area Network (MAN), Wide Area Network (WAN), and the Internet. The communication over the network 205 may be performed in accordance with various communication protocols, such as Transmission Control Protocol and Internet Protocol (TCP/IP), User Datagram Protocol (UDP), and IEEE communication protocols.

A client computing device 101 may be any computing device comprising a processor/microcontroller and/or any other electronic component that performs one or more operations according to one or more programming instructions. The examples of the computing device may include, but are not limited to, a desktop computer, a laptop, a personal digital assistant (PDA), a smartphone, a tablet computer, and the like. The client computing device 101 may be configured to communicate with the one or more servers (e.g., server 102) of the system 100 through one or more networks 105, using wired and/or wireless communication capabilities. A user interface 104 in the client computing device 101 may include a Graphical User Interface (GUI) that presents an interactive, graphical representation of an IC design, layout, schematic, or other logical representation of an IC that is being synthesized, designed, optimized, and verified using an IC synthesis tool 103. For example, the GUI 104 may provide an interface for a designer to provide and edit functional specifications of an IC using a hardware description language such as VHDL or Verilog. Furthermore, the GUI 104 may provide interactive elements such as buttons or icons for the user to enter and/or modify the functional specifications written in the hardware description language. The designer may also use the GUI 104 to provide synthesis commands to the system, which may be text based commands or graphical commands such as a click of a button.

As described above, the server 102 may be accessible to the client device 101 via one or more networks 105. The server 102 may be any computing device comprising a processor and other computing hardware configured to execute an IC synthesis tool 103 software module (e.g., EDA synthesis software) that may generate a gate level design from a hardware level description of the design written in, e.g., VHDL or Verilog. In operation, using a client device 101 to access a synthesis tool 103 hosted on a server 102 over a network 105, a circuit designer may interact with the IC synthesis tool 103, through a number of input devices of the client device 101, such as by inputting a selection as with a mouse or inputting a request as with a keyboard. The IC synthesis tool 103 may generate any number of graphical interface 104 responses based on the inputs received from the client device 101, and then send the data back to the client device 101 to be presented on the GUI 104.

The server 102 may include a design library 106 that is accessed by the IC synthesis tool 103. The design library 106 may include instances of various circuit devices used to design an IC. Non-limiting examples of circuit devices may include memory devices (e.g., D flip-flops, T flip-flops, SR flip flops, JK flip flops), combination logic gates (e.g., AND, OR, NOT, NOR, NAND. XOR), wires (also referred to as nets), and multiplexers, among others. In some embodiments, the design library 106 may include instances of standard cells (also referred to as cells) used by the IC synthesis tool 103 to generate an IC design. An instance of a cell may represent electronic circuit components such as a transistor, transmission line, or an optical fiber line. The design library 106 may include macros (or macroblocks) formed by a plurality of components. The IC synthesis tool 103, based upon instructions from a circuit designer, may invoke instances of macros to be placed in their entireties in the IC design. A macro may be, for example, a memory block, a third-party block, or an IP block, each configured to provide a generally complex functionality (e.g., more complex than a combination logic gate). In addition, the design library 106 may include instances of IO pins that the IC synthesis tool 103 may invoke to be placed at the boundary edges of the IC design. The IC synthesis tool 103 may therefore use instances of cells or any other types of design instances in the design library 106 to generate a netlist of an IC that can be sent to a manufacturing facility for fabrication.

The illustrative system 100 is shown in FIG. 1 as comprising only one server 102 for ease of explanation. However, it should be appreciated that the system 100 may comprise a number of servers 102. In some embodiments, the system 100 may comprise multiple interconnected, networked servers 102, some of which may execute various software modules configured to manage and control the resources and performance of the system 100. In some embodiments, the servers 102 may have parallel architectures configured to support multi-threading on multi-core workstations to handle large designs. In such embodiments, the servers 102 may be configured for distributed processing. The server 102 may be logically and physically organized within the same or different devices or structures, and may be distributed across any number of physical structures and locations (e.g., cabinets, rooms, buildings, cities). Furthermore, the system 100 with the IC synthesis tool 103 and the design library 106 located at the server 102 is merely for illustration and one or more of the IC synthesis tool 103 and the design library 106 may be within the client computing device 100.

In operation, the EDA system 100 may import an IC design. The imported IC design may either be synthesized and/or compiled within the system 100 (e.g., by the IC synthesis tool 103 using instances from the design library 106) or may be received from another computing device (e.g., a separate IC design synthesizer/compiler). Regardless the modality of the receipt by the EDA system 100, the imported IC design may include IO pins at pre-fixed locations. In some embodiments, the imported IC design may have unplaced IO pins. Compared to the conventional EDA tools that begin placement and placement optimization with a priori pre-fixed pins, the EDA system 100 may unplace the IO pins from the pre-fixed locations. The EDA system 100 may then set one or more IO pin constraints for the unplaced IO pins. The one or more IO pin constraints may have more degrees of freedom that than the pins with pre-fixed locations. For example, the one or more IO pin constraints may include an identification of a boundary edge (e.g., right, left, top, or bottom edge) of the IC design that a corresponding pin may have to be placed. Therefore, within the given boundary edge, the EDA system 100 may place the corresponding IO pin without violating the one or more IO pin constraints. In some embodiments, the EDA system 100 may have to place the IO pins inside the IC design based upon corresponding internal IO pin constraints. As another example, the one or more IO pin constraints may include a maximum allowed distance between a module (e.g., a cell or a macro) and an IO pin. The EDA system 100 may therefore place the corresponding IO pin at distance from the module as long as the distance is less than the maximum allowed distance. In some instances, the EDA system 100 may receive the one or more IO pin constraints from the circuit designer through an interface (e.g., user interface 104). In other instances, the EDA system 108 may determine the one or more IO pin constraints based upon one or more attributes of the IC design such as clustering and distribution of the cells and macros within the IC design. Alternatively, the EDA system 100 may receive a first subset of the one or more IO pin constraints from the circuit designer and determine a second subset of the one or more IO pin constraints based upon attributes of the IC design and/or the first subset of the one or more IO pin constraints.

After setting the IO pin constraints, the EDA system 100 may concurrently place the IO pins, the cells, and the macros in the IC design. In other words, a placement algorithm being executed within the EDA system 100 may concurrently calculate the initial placement positions of the internal components such as macros and cells and the components at the boundary edges such as the IO pins. When placing the IO pins, the EDA system 100 may not violate the one or more IO pin constraints, e.g., an IO pin designated to be placed at the right edge of the IC design may have to be placed at the right edge. After this initial concurrent placement of the cells, macros, and IO pins, the EDA system 100 may iteratively execute one or more optimization algorithms to concurrently optimize the placement locations of the cells, macros, and the IO pins. After reaching the desired level of optimization, the EDA system 100 may fix final optimized locations of the IO pins as the locations of the IO pins. The placement process flow for the IO pins may be complete after the EDA system 100 fixes the locations of the IO pins.

Figure 2:
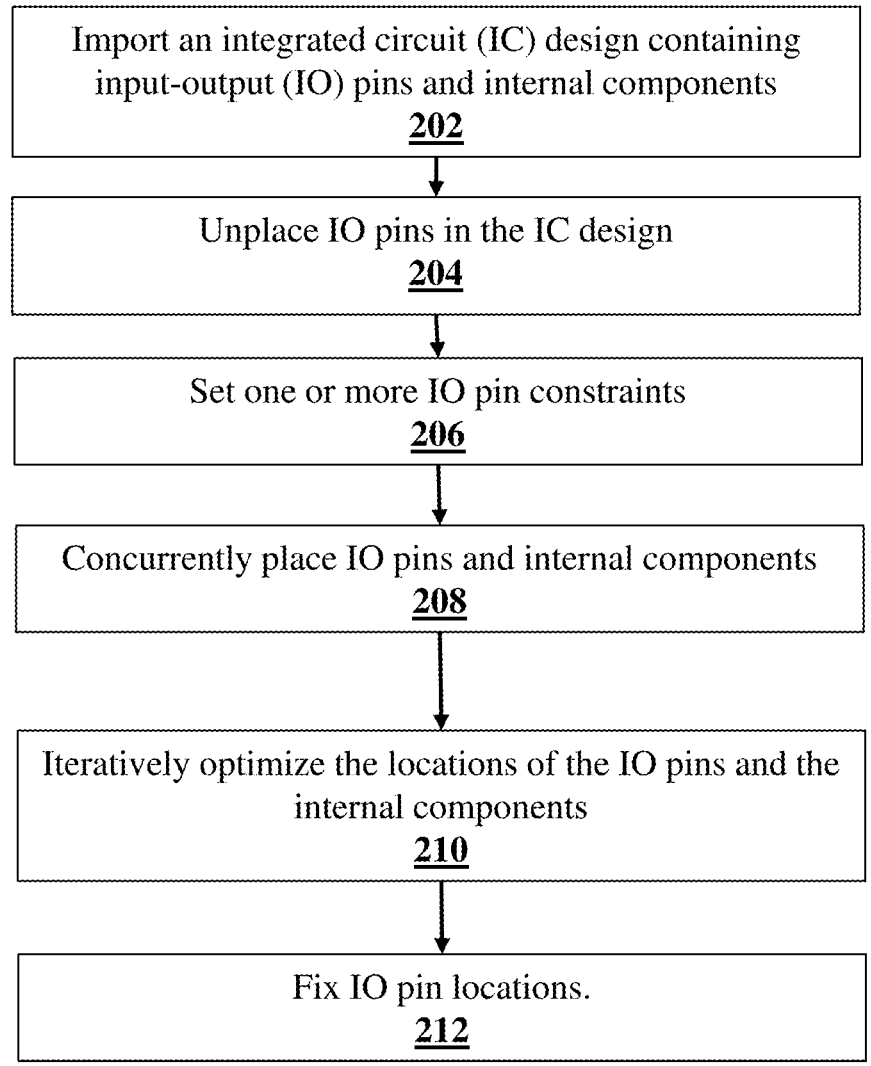
FIG. 2 shows a flow diagram of an illustrative method of concurrent placement of IO pins and internal components of an IC design, according to an embodiment.

FIG. 2 shows a flow diagram of an illustrative method 200 of concurrently placing IO pins with internal components in an IC design, according to an embodiment. It should be understood that the steps of the method 200 as shown in FIG. 2 and described herein are merely illustrative and alternate, additional, and a fewer number of steps should be considered within the scope of this disclosure. Although multiple computers can execute one or more steps of the method, the following describes a single computer executing all of the steps of the method. It should further be understood that the sequence of the steps described herein is merely illustrative and the computer may execute the steps in any sequence.

The method 200 may begin at step 202 where the computer imports an IC design containing IO pins and internal components. The IO pins are configured to connect a corresponding fabricated IC to other components within a larger circuit (e.g., a motherboard) or larger system (e.g., a control system). The internal components are the internal circuit components in the IC design. For example, the internal components may include cells, which may form discrete gates (e.g., AND, NAND, OR, NOR, or XOR) or memory units (e.g., flip-flop) within the IC design. As another example, the internal components may include macros, which may be blocks providing a particular functionality, third-party blocks, and/or IP blocks. It should generally be understood that the aforementioned components are non-limiting examples and any components within the boundary edges of the IC design should be considered within the scope of this disclosure.

In some instances, the imported IC design may already be compiled either by the computer or another computer. In other instances, the computer may provide an interface for a circuit designer generate the IC design using hardware description language such as VHDL or Verilog. For example, the circuit designer may provide behavioral specification of the IC design through various modules programmed using VHDL or Verilog and the computer may compile the modules to generate a register transfer level (RTL) version of the design. Regardless of the modality of the importing the IC design, the IC design may include the internal components and the IO pins that are to be placed and optimized in the subsequent steps of the method 200. The imported IC design may already have pre-fixed locations for the IO pins.

At a next step 204, the computer may unplace the IO pins in the IC design. As described above, the IO pins may have been placed at pre-fixed locations by a compiler and/or any other software module generating or updating the IC design. The pre-fixed locations may include a plurality of locations on the boundary edges of the IC design. The unplacing of the IO pins from the pre-fixed locations allows the computer to concurrently place the unplaced IO pins along with the internal components of the IC design.

At a next step 206, the computer may set one or more IO pin constraints. In some instances, the computer may receive the IO pin constraints entered by the circuit designer through an interface such as a graphical user interface. In other instances, the computer may set the IO pin constraints based upon one or more attributes of the IC design (e.g., distribution of the various modules connected to the IO pins). A non-limiting example of an IO pin constraint may be the boundary edge for the IO pin. For instance, the IC design may be rectangular with four edges: right, left, top, and bottom. An IO pin constraint for an IO pin may be the edge (e.g., right edge) of the IC design where the IO pin may have to be placed. In other words, the computer may flexibly place the IO pin anywhere on the specified edge without violating the corresponding IO pin constraint. Another non-limiting example of an IO pin constraint may be a relationship (e.g., distance) between an internal component of the IC design and an IO pin of the IC design. For instance, a macro within the IC design may have to be within a predefined distance from the IO pin. It should be understood that these examples of IO pin constraints are merely provided for the ease of explanation. Any kind of IO pin constraint within which the computer may flexibly place the IO pins concurrently with other internal components of the IC design should be considered within the scope of this disclosure.

At a next step 208, the computer may concurrently place IO pins and internal components. For example, the computer may perform a mixed concurrent placement by placing IO pins, macros, and cells together in the IC design. The computer may place the IO pins, macros, and cells at initial locations to define an initial distribution of the IO pins, macros, and cells. In the subsequent steps below, the computer may iteratively optimize the initial distribution of the IO pins, macros, and cells. The computer may perform the initial placement of IO pins to obey the one or more IO pin constraints set in step 206.

At a next step 210, the computer may iteratively optimize the locations of the IO pins and the internal components. For instance, the computer may run one or more optimization algorithms to distribute the internal components such that the IC design has a smaller wirelength and consumes less power. The one or more optimization algorithms may also reduce the overall area of the IC design. Furthermore, the one or more optimization algorithms may reduce the number of negative slacks of the IC design. One or more of these optimizations may be realized on a chip fabricated from the IC design. During the iterative optimization steps, the computer may update the placement of the IO pins to obey one or more IO pin constraints set in step 206.

At a next step 212, the computer may fix the IO pin locations. The fixed IO pin locations may be the optimized locations of the IO pins. The fixed IO pins therefore may form a more optimized IC designs compared to the IC designs generated by the conventional EDA tools that cannot change the pre-fixed locations of the IO pins during a placement process flow.

Figure 3:
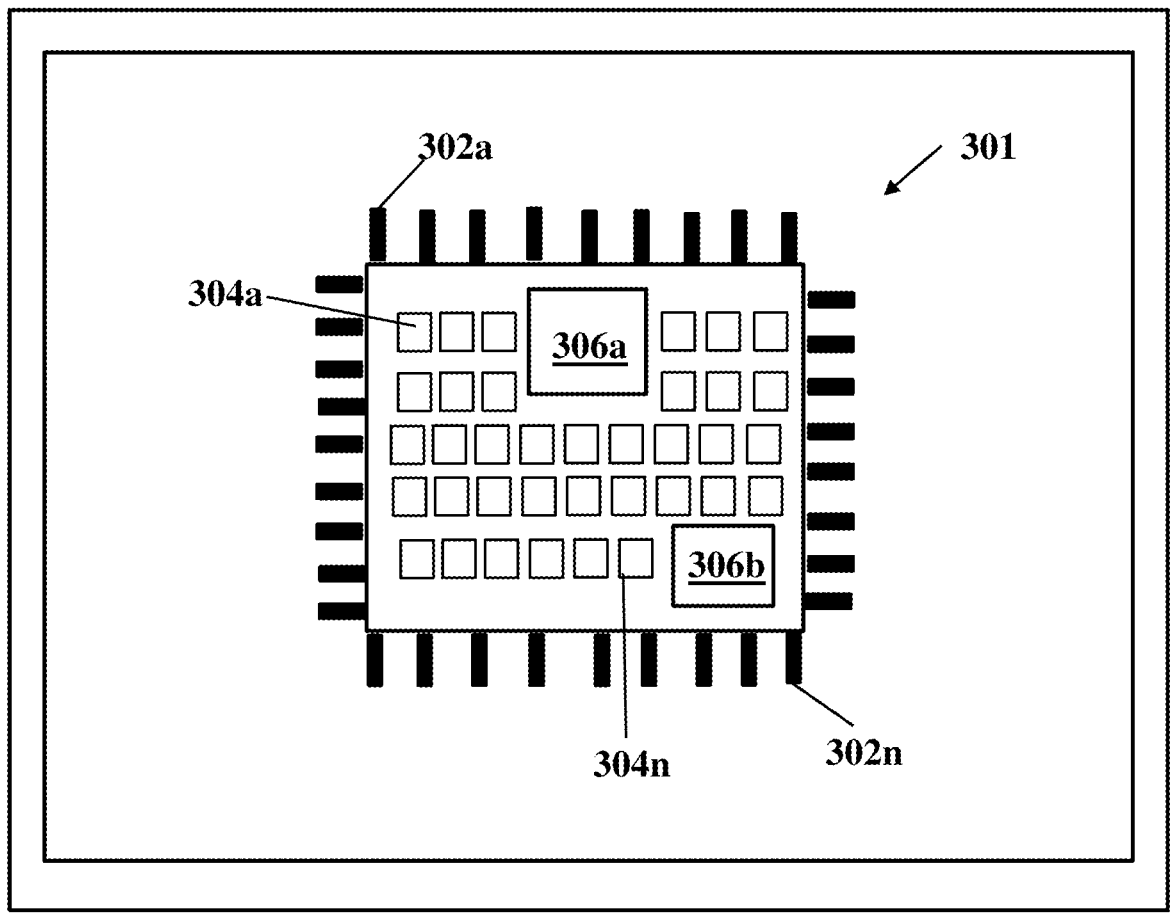
FIG. 3 shows an illustrative graphical user interface (GUI) generated by a computer while performing a concurrent placement of IO pins and internal components of an IC design, according to an embodiment.

FIG. 3 shows an illustrative GUI 300 generated by a computer while performing a concurrent placement of IO pins and internal components of the IC design 301, according to an embodiment. It should be understood that the GUI 300 and the IC design 301 and the components therein are merely for illustration and ease of explanation and should not be considered limiting.

As shown, the IC design 301 may include a plurality of IO pins 302*a*-302*n* (collectively and commonly referred to as 302), a plurality of cells 304*a*-304*n* (collectively or commonly referred to as 304), and a plurality of macros 306*a*, 306*b* (collectively or commonly referred to as 306). The IC design 301 may be at any stage of placement or placement optimization utilizing embodiments disclosed throughout this disclosure. More particularly, the computer may concurrently perform placement and placement optimization of the plurality of IO pins 302 (obeying one or more IO pin constraints), the plurality of the cells 304, and the plurality of the macros 306. Compared to the conventional systems, the computer may minimize split modules in the IC design 301 and enable the IC design 301 to have a higher QoR performance.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   importing, by a computer, an integrated circuit design including a plurality of input-output pins and a plurality of internal components;
   unplacing, by the computer, the plurality of input-output pins of the imported integrated circuit design;
   setting, by the computer, one or more input-output pin constraints for the integrated circuit design;
   concurrently placing, by the computer, the plurality of input-output pins and the plurality of internal components, wherein the placement of the plurality of input-output pins obeys the one or more input-output pin constraints; and
   iteratively optimizing, by the computer, the concurrent placement of the plurality of input-output pins and the plurality of internal components by updating corresponding locations of at least one input-output pin and at least one internal component, wherein an updated location of the at least one input-output pin obeys the one or more input-output pin constraints.

2. The computer-implemented method of claim 1, wherein the plurality of internal components include at least one of a cell or a macro.

3. The computer-implemented method of claim 1, further comprising:
setting, by the computer, the updated location of the at least one input-output pin as a final location of the at least one input-output pin.

4. The computer-implemented method of claim 1, wherein the one or more input-output pin constraints include an identification of a boundary edge where corresponding input-output pin has to be placed.

5. The computer-implemented method of claim 1, wherein the one or more input-output pin constraints include a maximum distance between an input-output pin and an internal component.

6. The computer-implemented method of claim 1, further comprising:
receiving, by the computer, the one or more input-output pin constraints from a user.

7. The computer-implemented method of claim 1, further comprising:
determining, by the computer, the one or more input-output pin constraints based upon one or more parameters in the integrated circuit design.

8. The computer-implemented method of claim 1, wherein the iterative optimization reduces wirelength or an area of the integrated circuit design.

9. The computer-implemented method of claim 1, wherein the iterative optimization reduces power consumption of negative slacks of a fabricated integrated circuit utilizing the integrated circuit design.

10. A system comprising:
a non-transitory storage medium storing a plurality of computer program instructions; and
a processor electrically coupled to the non-transitory storage medium and configured to execute the plurality of computer program instructions to:
import an integrated circuit design including a plurality of input-output pins and a plurality of internal components;
unplace the plurality of input-output pins of the imported integrated circuit design;
set one or more input-output pin constraints for the integrated circuit design;
concurrently place the plurality of input-output pins and the plurality of internal components, wherein the placement of the plurality of input-output pins obeys the one or more input-output pin constraints; and
iteratively optimize the concurrent placement of the plurality of input-output pins and the plurality of internal components by updating corresponding locations of at least one input-output pin and at least one internal component, wherein an updated location of the at least one input-output pin obeys the one or more input-output pin constraints.

11. The system of claim 10, wherein the plurality of internal components include at least one of a cell or a macro.

12. The system of claim 10, wherein the processor is configured to further execute the plurality of computer program instructions to:
set the updated location of the at least one input-output pin as a final location of the at least one input-output pin.

13. The system of claim 10, wherein the one or more input-output pin constraints include an identification of a boundary edge where corresponding input-output pin has to be placed.

14. The system of claim 10, wherein the one or more input-output pin constraints include a maximum distance between an input-output pin and an internal component.

15. The system of claim 10, wherein the processor is configured to further execute the plurality of computer program instructions to:
receive the one or more input-output pin constraints from a user.

16. The system of claim 10, wherein the processor is configured to further execute the plurality of computer program instructions to:
determine the one or more input-output pin constraints based upon one or more parameters in the integrated circuit design.

17. The system of claim 10, wherein the iterative optimization reduces wirelength or an area of the integrated circuit design.

18. The system of claim 10, wherein the iterative optimization reduces power consumption or negative slacks of a fabricated integrated circuit utilizing the integrated circuit design.

19. A computer readable non-transitory medium containing one or more computer instructions, which when executed by a processor cause the processor to:
import an integrated circuit design including a plurality of input-output pins and a plurality of internal components;
unplace the plurality of input-output pins of the imported integrated circuit design;
set one or more input-output pin constraints for the integrated circuit design;
concurrently place the plurality of input-output pins and the plurality of internal components, wherein the placement of the plurality of input-output pins obeys the one or more input-output pin constraints; and
iteratively optimize the concurrent placement of the plurality of input-output pins and the plurality of internal components by updating corresponding locations of at least one input-output pin and at least one internal component, wherein an updated location of the at least one input-output pin obeys the one or more input-output pin constraints.

20. The computer readable non-transitory medium of claim 19, wherein the plurality of internal components include at least one of a cell or a macro.

* * * * *